(12) United States Patent
Yamashita

(10) Patent No.: US 9,728,187 B2
(45) Date of Patent: Aug. 8, 2017

(54) ELECTRONIC DEVICE, INFORMATION TERMINAL SYSTEM, AND METHOD OF STARTING SOUND RECOGNITION FUNCTION

(71) Applicant: Alpine Electronics, Inc., Tokyo (JP)

(72) Inventor: Hirokazu Yamashita, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/003,213

(22) Filed: Jan. 21, 2016

(65) Prior Publication Data

US 2016/0240196 A1    Aug. 18, 2016

(30) Foreign Application Priority Data

Feb. 16, 2015  (JP) .................................. 2015-027687

(51) Int. Cl.
| | |
|---|---|
| *G10L 15/22* | (2006.01) |
| *G10L 15/30* | (2013.01) |
| *G10L 15/32* | (2013.01) |
| *G10L 15/08* | (2006.01) |

(52) U.S. Cl.
CPC .............. *G10L 15/22* (2013.01); *G10L 15/30* (2013.01); *G10L 15/32* (2013.01); *G10L 2015/088* (2013.01); *G10L 2015/223* (2013.01)

(58) Field of Classification Search
CPC ......... G10L 15/30; G10L 15/32; G10L 15/22; G10L 2015/088
See application file for complete search history.

(56) References Cited

U.S. PATENT DOCUMENTS

| | | | | |
|---|---|---|---|---|
| 6,052,666 | A * | 4/2000 | Diehl ...................... | G10L 13/00 704/270 |
| 6,112,103 | A * | 8/2000 | Puthuff ................. | H04M 1/247 455/550.1 |
| 6,339,706 | B1 * | 1/2002 | Tillgren ................. | G08C 17/02 455/419 |
| 6,397,186 | B1 * | 5/2002 | Bush ....................... | G10L 15/26 704/272 |
| 6,584,439 | B1 * | 6/2003 | Geilhufe ................. | G10L 15/26 704/270 |
| 6,988,070 | B2 * | 1/2006 | Kawasaki ............... | G10L 15/26 704/270 |
| 6,993,486 | B2 * | 1/2006 | Shimakawa .............. | G06F 3/16 704/270 |
| 7,801,730 | B1 * | 9/2010 | Miyazaki .......... | H04L 12/40117 704/275 |

(Continued)

FOREIGN PATENT DOCUMENTS

JP         2010-74472 A      4/2010

*Primary Examiner* — Samuel G Neway
(74) *Attorney, Agent, or Firm* — Brinks Gilson & Lione

(57) ABSTRACT

An on-vehicle device can simultaneously connect smart phones provided with a sound recognition function through short-distance wireless communications. The on-vehicle device determines whether a specific keyword for starting the sound recognition function of the smart phones is included in an utterance sound of a user. When the keyword is included, the on-vehicle device selects the smart phone identified with the keyword, and transmits a sound signal of the utterance sound to the selected smart phone.

15 Claims, 9 Drawing Sheets

(56) References Cited

U.S. PATENT DOCUMENTS

| | | | | |
|---|---|---|---|---|
| 8,010,369 B2* | 8/2011 | Alfred | H04L 12/2818 704/275 |
| 8,340,975 B1* | 12/2012 | Rosenberger | G10L 15/22 704/270 |
| 9,026,447 B2* | 5/2015 | Geldbach | G10L 15/22 704/246 |
| 2001/0040496 A1* | 11/2001 | Wang | A61B 17/00 340/3.5 |
| 2005/0086056 A1* | 4/2005 | Yoda | G10L 15/24 704/246 |
| 2007/0005206 A1* | 1/2007 | Zhang | G06F 3/16 701/36 |
| 2012/0282908 A1* | 11/2012 | Nicolini | H04W 4/04 455/418 |
| 2013/0073293 A1* | 3/2013 | Jang | G10L 15/22 704/275 |
| 2013/0238326 A1* | 9/2013 | Kim | G06F 3/167 704/231 |
| 2013/0317827 A1* | 11/2013 | Fu | G10L 17/00 704/273 |
| 2014/0288930 A1* | 9/2014 | Kotani | G10L 15/22 704/246 |
| 2015/0194050 A1* | 7/2015 | Lee | G08C 17/02 340/12.22 |
| 2015/0228274 A1* | 8/2015 | Leppanen | G10L 15/20 704/243 |
| 2015/0287411 A1* | 10/2015 | Kojima | G10L 15/22 704/246 |
| 2016/0240196 A1* | 8/2016 | Yamashita | G10L 15/22 |

* cited by examiner

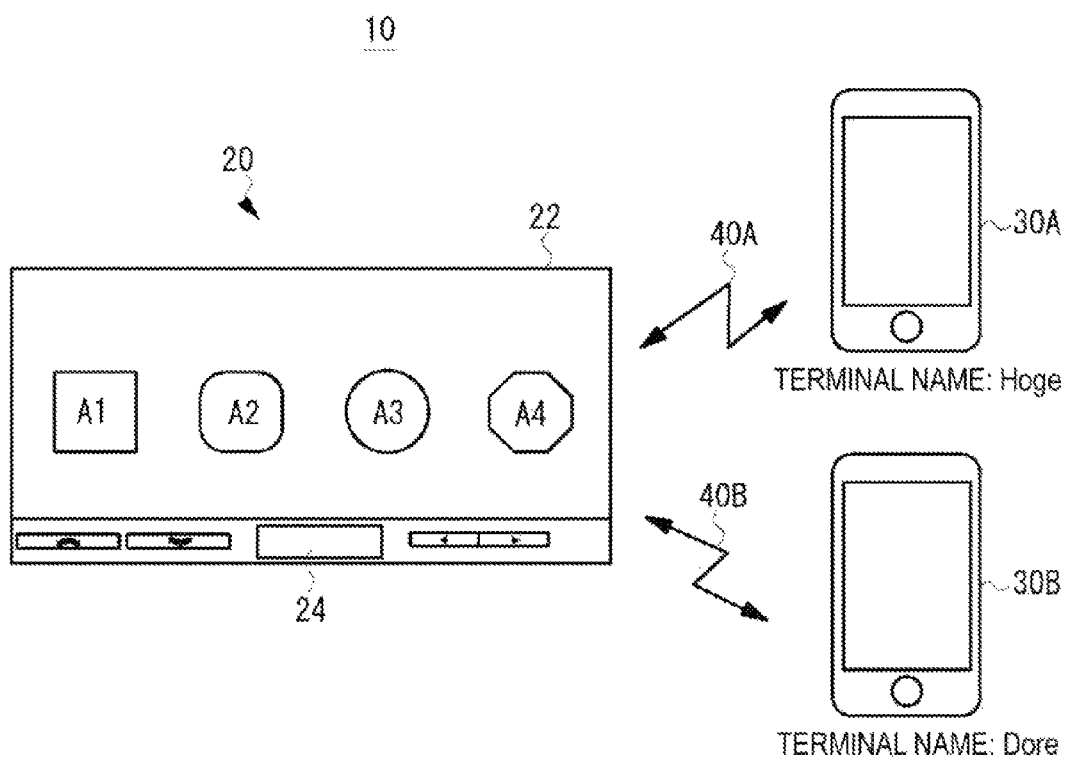

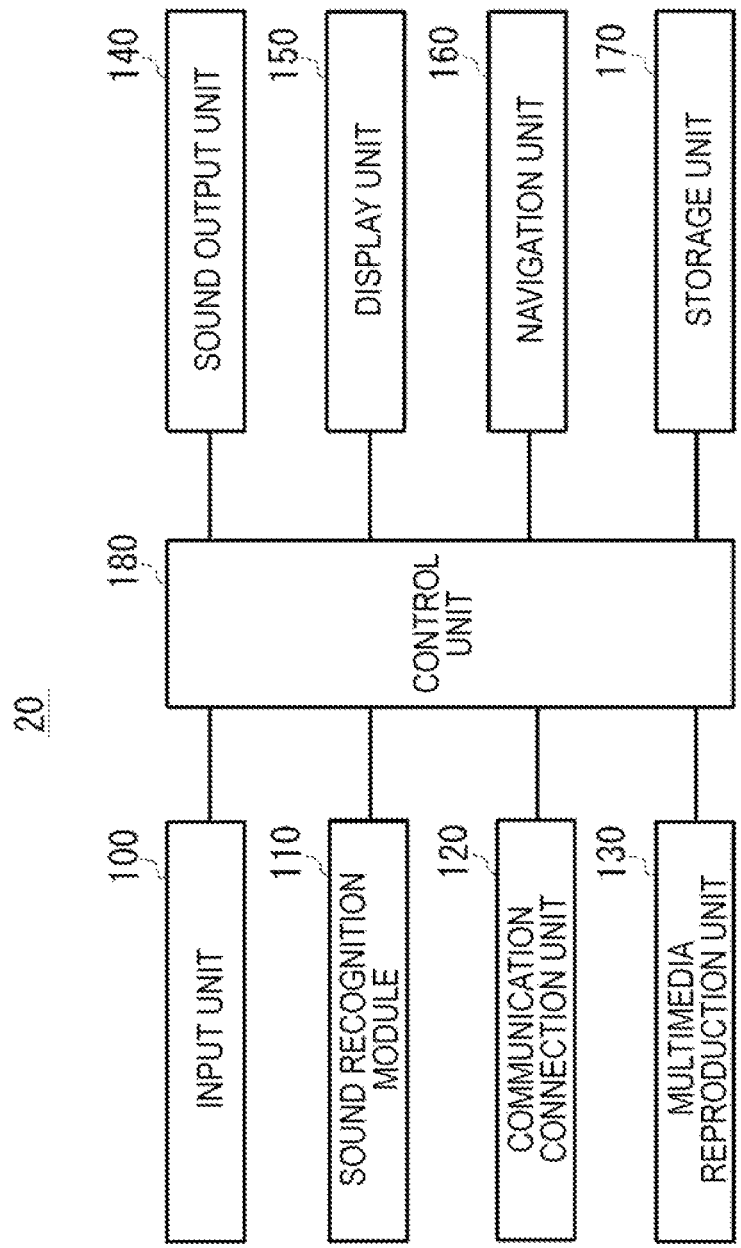

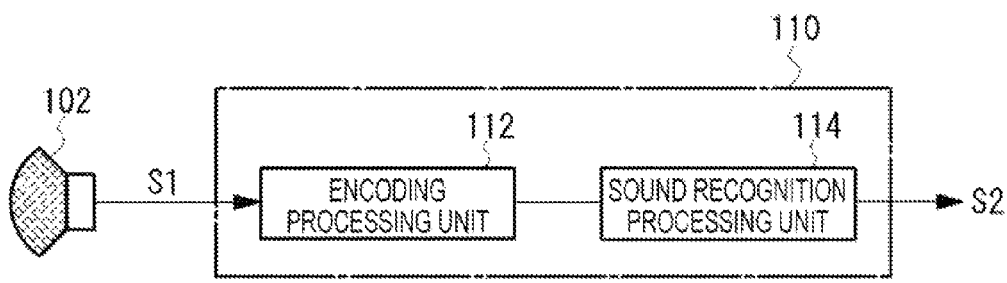
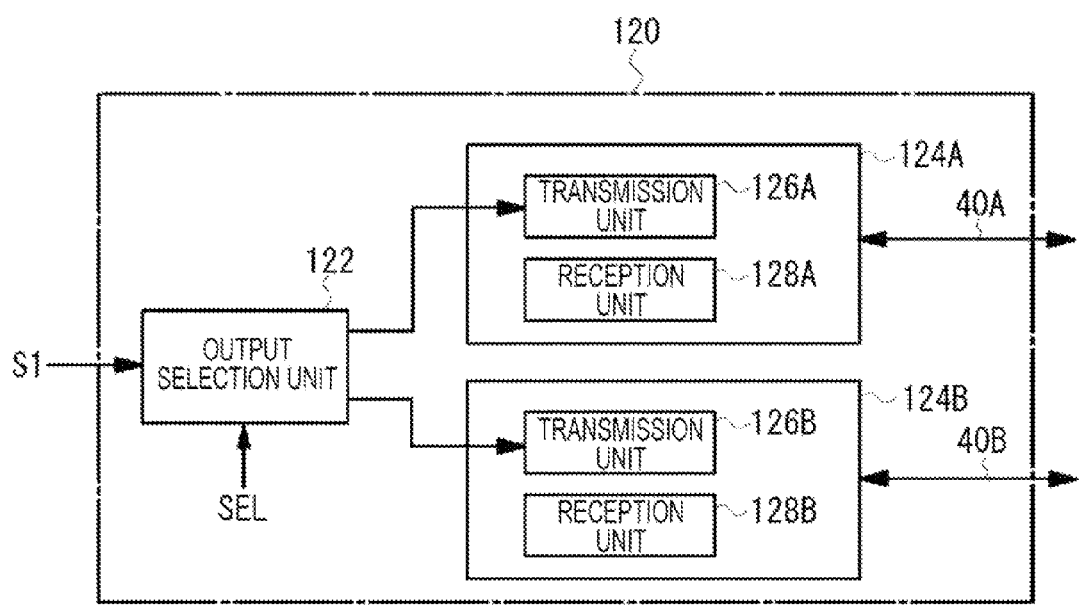

ELECTRONIC DEVICE, INFORMATION TERMINAL SYSTEM, AND METHOD OF STARTING SOUND RECOGNITION FUNCTION

RELATED APPLICATIONS

The present application claims priority to Japanese Patent Application Serial Number 2015-027687, filed Feb. 16, 2015, the entirety of which is hereby incorporated by reference.

BACKGROUND

1. Field of the Disclosure

The present disclosure relates to an electronic device that can connect a plurality of information terminals, and especially relates to a method of starting a sound recognition function of the plurality of information terminals from the electronic device.

2. Description of the Related Art

In environments where a manual input with a keyboard or the like is difficult, for example, during driving, use of sound inputs has been increasing as input means to an on-vehicle device. Further, information terminals such as a smart phone, a tablet-type terminal, and the like brought into a vehicle are connected to the on-vehicle device, and functions of the information terminals can be used on the on-vehicle device.

When the plurality of information terminals is brought into the vehicle, it is necessary to select a connection destination of the information terminal that is to perform communication with the on-vehicle device. JP 2010-74472 A discloses a method of storing sound models in which sound characteristics of a plurality of speakers are modeled, and identification information of mobile phone devices corresponding to the respective sound models in association with each other, identifying, when there is an utterance of a sound, the mobile phone device corresponding to the sound model matched with the sound, and selecting the identified mobile phone device as a connection destination of communication.

SUMMARY

FIG. 11 is a diagram illustrating an example of a conventional connection system of information terminals. As illustrated in FIG. 11, when a plurality of smart phones (multi-function-type information terminals) 4A and 4B is brought into a vehicle, the smart phones 4A and 4B are connected with an on-vehicle device 1 through short-distance wireless communications 5A and 5B. The short-distance wireless communication 5A is, for example, Bluetooth (registered trademark), WiFi (registered trademark), or the like. When communication connection between the smart phones 4A and 4B and the on-vehicle device 1 is established, a menu screen 2 for using functions of the smart phones 4A and 4B is started on a display unit of the on-vehicle device 1, and user inputs to the smart phones 4A and 4B can be performed using icons A1, A2, A3, and A4 on the menu screen 2. For example, when the icon A1 is selected, a navigation function mounted in the smart phone 4A is executed, image data is transmitted from the smart phone 4A to the on-vehicle device 1, and a load map including an own vehicle position is displayed on the display unit of the on-vehicle device. When the icon A2 is selected, an audio reproduction function mounted in the smart phone 4B is executed, audio data is transmitted from the smart phone 4B to the on-vehicle device, and sounds of music and the like are output from a speaker of the on-vehicle device.

Further, a sound recognition button 3 for starting sound recognition functions mounted in the smart phones 4A and 4B is provided on the menu screen. By selecting the sound recognition button 3, the user can perform a sound input, and a sound signal uttered by the user is transmitted to either the smart phone 4A or 4B in order to avoid complexity of a user interface. For example, when a couple has a ride in the car, and the sound recognition button 3 is pressed in a state where the navigation function is executed with one smart phone 4A, and an entertainment function to reproduce music and the like is executed with the other smart phone 4B, there is a problem that the on-vehicle device 1 cannot determine which smart phone's sound recognition function the user wishes to use. Further, an operation according to a sound recognition result is executed in the smart phone that has executed sound recognition. Therefore, for example, if the sound signal uttered in order to use the entertainment function is transmitted to the smart phone 4A that is executing the navigation function, an operation different from an operation desired by the user is executed. For example, when utterance content of "want to go OO" is transmitted to the smart phone 4B that is executing the entertainment function, and an operation according to the sound recognition result of "want to go OO" is executed in the smart phone 4B, an unintended navigation function is started in the smart phone 4B. When utterance content of "reproduce XX" is transmitted to the smart phone that does not have the content, and an operation according to the sound recognition result of the "reproduce XX" is performed in the smart phone, the smart phone cannot reproduce the content because the smart phone does not have the content.

Forms of the present invention solves such conventional problems, and an objective is to provide an electronic device, an information terminal system, and a method of starting a sound recognition function, which can select an information terminal from among a plurality of information terminals according to an utterance sound of a user, and can automatically start the sound recognition function of the selected information terminal.

An electronic device according to forms of the present invention includes: a connection unit configured to be able to simultaneously connect a plurality of information terminals provided with a sound recognition function; a sound input unit configured to receive an utterance sound and output a sound signal corresponding to the utterance sound; a sound recognition unit configured to perform sound recognition of the sound signal output from the sound input unit; a determination unit configured to determine whether specific identification information is included in the sound signal, based on a sound recognition result of the sound recognition unit; a selection unit configured to select the information terminal to which the sound signal is to be transmitted, based on the specific identification information, when it has been determined that the specific identification information is included, by the determination unit; and a transmission control unit configured to transmit the sound signal through the connection unit, based on a selection result of the selection unit.

Favorably, the specific identification information is information for starting the sound recognition function of the information terminal. Favorably, the specific identification information is a name for identifying the information terminal. Favorably, the electronic device further includes a storage unit that stores the specific identification information in association with each information terminal connected to the connection unit, and the determination unit determines existence/non-existence of the specific identification information by reference to the storage unit. Favorably, the electronic device further includes a warning unit that warns that the specific identification information is not included when it has been determined that the specific identification information is not included, by the determination unit. Favorably, the electronic device further includes an acquisition unit that acquires the specific identification information from the information terminal connected to the connection unit. Favorably, the warning unit warns that the specific identification information is the same when the specific identification information of the respective information terminals connected by the connection unit is the same. Favorably, the warning unit warns that the specific identification information cannot be acquired when the specific identification information of the information terminal connected by the connection unit cannot be acquired.

The information terminal system according to forms of the present invention includes the electronic device having the above-described configuration and at least first and second information terminals, the first information terminal includes a first sound recognition function configured to be started in response to first specific identification information, a first execution unit configured to execute a function corresponding to a recognition result of the first sound recognition function, and a first transmission unit configured to transmit an execution result of the first execution unit to the electronic device, the second information terminal includes a second sound recognition function configured to be started in response to second specific identification information, a second execution unit configured to execute a function corresponding to a recognition result of the second sound recognition function, and a second transmission unit configured to transmit an execution result of the second execution unit to the electronic device, and the electronic device includes an output unit configured to output the execution result transmitted from the first transmission unit or the second transmission unit.

Favorably, the first information terminal includes the first transmission unit that transmits the first specific identification information when connected to the electronic device through the connection unit, and the second information terminal includes the second transmission unit that transmits the second specific identification information when connected to the electronic device through the connection unit. Favorably, the first information terminal includes a first setting unit that sets the first specific identification information, and the second information terminal includes a second setting unit that sets the second specific identification information.

A method of starting a sound recognition function in an electronic device including a connection unit configured to be able to simultaneously connect a plurality of information terminals including the sound recognition function, and a sound input unit configured to receive an utterance sound, and provide a sound signal corresponding to the utterance sound, the method including the steps of recognizing a sound signal provided from the sound input unit, determining whether specific identification information is included in the sound signal recognized in the sound recognition step, a selecting the information terminal to which the sound signal is to be transmitted, based on the specific identification information when it has been determined that the specific identification information is included, and transmitting the sound signal to the selected information terminal, wherein the specific identification information is information that starts the sound recognition function of the information terminal.

According to forms of the present invention, when specific identification information is included in an utterance sound, an information terminal identified with the specific identification information is selected, and a sound signal is transmitted to the selected information terminal. Therefore, a sound recognition function of the information terminal, which meets intention of the user, can be used.

BRIEF DESCRIPTION OF THE DRAWINGS

FIG. 1 is a schematic view illustrating an entire sound input system according to a first form of the present invention;

FIG. 2 is a diagram illustrating a configuration example of an on-vehicle device according to the first form of the present invention;

FIG. 3 is a diagram illustrating an internal configuration of a sound recognition module illustrated in FIG. 2;

FIG. 4 is a diagram illustrating an internal configuration of a communication connection unit illustrated in FIG. 2;

DETAILED DESCRIPTION OF THE DRAWINGS

Figure 5:
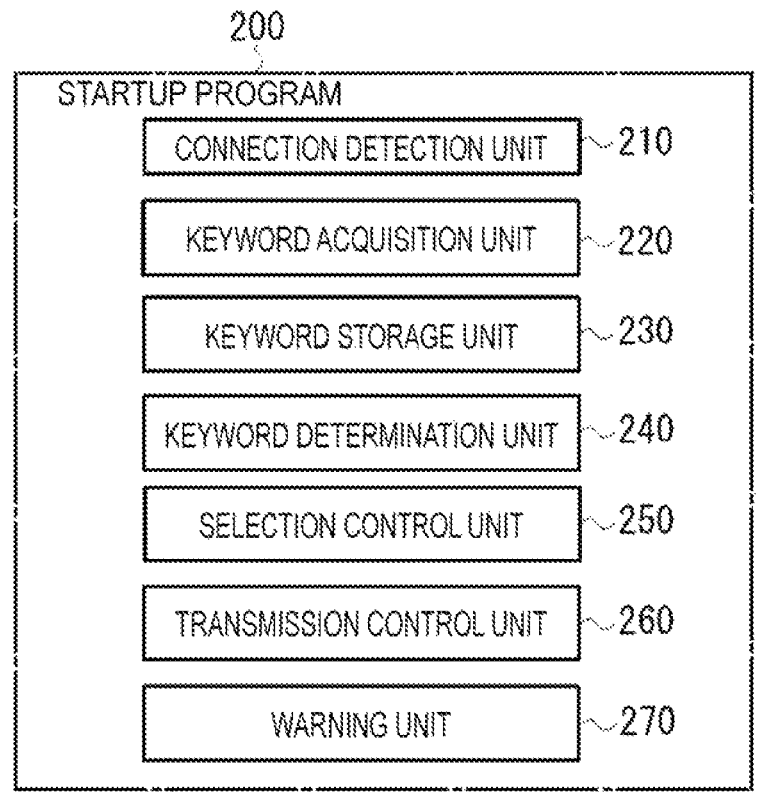
FIG. 5 is a diagram illustrating a functional configuration example of a startup program executed by the on-vehicle device according to the first form of the present invention.

Next, forms of the present invention will be described. An electronic device according to the one form is mounted in a vehicle in advance or brought into the vehicle, for example. The electronic device can be an on-vehicle device mounted in the vehicle. The electronic device can be a computer, an electronic processing device, an information processing device, or the like. The electronic device can include a function to perform communication with an external device, a navigation function, a function to reproduce audio/video data, a function to receive television/radio, and the like.

Further, an information terminal may be a smart phone, a mobile phone device, a tablet terminal, or the like. The information terminal is connected to the electronic device in the vehicle when brought into the vehicle, and the electronic device can use a function mounted in the information terminal. For example, the electronic device can use the navigation function, the music reproduction function, or the like mounted in the information terminal. That is, when the navigation function is executed in the information terminal, a load map of the navigation function is displayed in a display unit of the electronic device. When audio data is reproduced in the information terminal, audio reproduced from a speaker of the electronic device is output. Further, the information terminal may include a sound recognition function, and when a plurality of information terminals is connected to the electronic device, the electronic device recognizes an utterance sound input to the electronic device, thereby to start the sound recognition function of any of the information terminal.

Hereinafter, forms of the present invention will be described with reference to the drawings. FIG. 1 is a schematic view illustrating one form of an entire information terminal system. An information terminal system 10 includes an on-vehicle device 20 as an electronic device and smart phones 30A and 30B as information terminals. The smart phones 30A and 30B are connected to the on-vehicle device 20 through short-distance wireless communications 40A and 40B, respectively. When the smart phones 30A and 30B are connected, the on-vehicle device 20 displays, on a display unit, a menu screen 22 for using functions of the smart phones 30A and 30B, thereby making cooperation with the smart phones easy. Icons A1, A2, A3, and A4 are displayed on the menu screen 22. When the icon A1 is selected by a user, an input signal is transmitted to the smart phone 30A through the communication 40A, the navigation function mounted in the smart phone 30A is executed, image data of the navigation function executed in the smart phone 30A is transmitted to the on-vehicle device 20, and then a load map including an own vehicle position is displayed on the display unit of the on-vehicle device. When the icon A2 is selected by the user, an input signal is transmitted to the smart phone 30B through the communication 40B, the audio reproduction function mounted in the smart phone 30B is executed, for example, audio data of the audio reproduction function executed in the smart phone 30B is transmitted to the on-vehicle device 20, and a sound is output from a speaker of the on-vehicle device 20.

Further, own unique sound input/sound recognition functions are respectively mounted in the smart phones 30A and 30B. While the smart phones 30A and 30B are connected to the on-vehicle device 20, an utterance sound to the on-vehicle device 20 can be input to either the smart phone 30A or 30B, and the sound recognition function can be used. The user presses a sound recognition button 24 on the menu screen 22 when inputting the utterance sound. In other words, when the sound recognition button 24 is pressed, the utterance sound of the user is taken in to the on-vehicle device 20. The on-vehicle device 20 performs sound recognition of the taken-in utterance sound, selects/determines which sound recognition function of the smart phones 30A and 30B the on-vehicle device 20 will use, based on a recognition result, and starts the selected sound recognition function of the smart phone.

Further, the on-vehicle device 20 can simultaneously connect a plurality of smart phones, with short-distance wireless communication. The short-distance wireless communication can be Bluetooth (registered trademark), WiFi (registered trademark), a wireless LAN, or another communication means. The on-vehicle device 20 can receive image data and audio from each smart phone and output the received image data and audio in the state where the plurality of smart phones is connected. The on-vehicle device 20 has a function to adjust outputs not to allow a plurality of image data or a plurality of audio data to compete with one another.

FIG. 2 is a diagram illustrating a configuration example of the on-vehicle device 20. The on-vehicle device 20 includes an input unit 100, a sound recognition module 110, a communication connection unit 120, a multimedia reproduction unit 130, a sound output unit 140, a display unit 150, a navigation unit 160, a storage unit 170, and a control unit 180.

The input unit 100 receives an input from the user, and provides the control unit and the like with the input. The input unit 100 includes a touch panel, an input key device, a microphone used to input the utterance sound of the user, and the like. The user presses the sound recognition button 24 illustrated in FIG. 1 when performing a sound input. Accordingly, an utterance sound input to the microphone is converted into an electrical sound signal and is provided to the sound recognition module 110 and the like.

The sound recognition module 110 receives the sound signal from the microphone and performs sound recognition of the sound signal. FIG. 3 is a diagram illustrating an internal configuration example of a sound recognition module 110. The sound recognition module 110 includes an encoding processing unit 112 that receives a sound signal S1 from the microphone 102, and performs encoding processing of the sound signal, and a sound recognition processing unit 114 that performs sound recognition of the sound signal subjected to the encoding processing. The sound recognition processing unit 114 recognizes 50-character syllabary, alphabets, and the like included in the utterance sound from the encoded sound signal. A recognition result S2 is provided to the control unit 180.

The communication connection unit 120 includes a plurality of communication channels that enables simultaneous connection of the plurality of smart phones 30A and 30B with the short-distance wireless communications 40A and 40B, as illustrated in FIG. 1. Here, an example of simultaneously connecting the two smart phones 30A and 30B is described. Therefore, the communication connection unit 120 includes two communication channels. However, three or more smart phones are simultaneously connected, the communication connection unit 120 includes three or more communication channels.

FIG. 4 is a diagram illustrating an internal configuration example of the communication connection unit 120. The communication connection unit 120 includes an output selection unit 122 that inputs the sound signal S1, and selects an output of the sound signal S1, and two communication channels 124A and 124B connected to the output selection unit 122. The output selection unit 122 outputs the sound signal S1 to the communication channel 124A or 124B according to a selection signal SEL from the control unit 180. The communication channel 124A includes a transmission unit 126A that transmits data to the smart phone 30A through the short-distance wireless communication 40A and a reception unit 128A that receives data from the smart phone 30A through the short-distance wireless communication 40A, and enables bidirectional data communication with the smart phone 30A. The communication channel 124B includes a transmission unit 126B that transmits data to the smart phone 30B through the short-distance wireless communication 40B and a reception unit 128B that receives data from the smart phone 30B through the short-distance wireless communication 40B, and enables bidirectional data communication with the smart phone 30B.

When the utterance sound of the user is input to the microphone 102, the output selection unit 122 selects either the communication channel 124A or 124B according to the selection signal SEL, and transmits the sound signal S1 to the smart phone 30A or 30B through the transmission unit 126A or 126B of the selected communication channel 124A or 124B. Meanwhile, the smart phone 30A or 30B starts the sound recognition function, based on the received sound signal S1, performs sound recognition of the sound signal S1, and executes an operation according to the sound recognition result. Image data or audio data related to the executed operation is received by the reception unit 128A or 128B of the selected communication channel 124A or 124B, and the received image data is displayed on the display unit 150 or the received audio data is output from the sound output unit 140.

The multimedia reproduction unit 130 reproduces video data and audio data recorded in a recording medium such as a DVD, a CD, or a Blu-ray disk. The reproduced video data is displayed on the display unit 150 and the audio data is output from the sound output unit 140.

The sound output unit 140 outputs the audio data reproduced by the multimedia reproduction unit 130 and the audio data received from the smart phones 30A and 30B through the communication connection unit 120. The display unit 150 outputs the image data reproduced by the multimedia reproduction unit 130 and the image data received from the smart phones 30A and 30B through the communication connection unit 120.

The navigation unit 160 displays the load map around the own vehicle position on the display unit 150 and performs search or guidance of a route to a destination, based on positional information transmitted from a GPS satellite or positional information obtained from a sensor such as an on-vehicle gyro sensor or acceleration sensor. The storage unit 170 can store application software to be executed in the on-vehicle device 20, a program executed by the control unit 180, other necessary data, and the like. For example, the storage unit 170 can store a database of load data and facility data required by the navigation unit 160.

The control unit 180 includes a micro processor or a micro controller, and controls the units by executing the program and the like stored in ROM/RAM or the storage unit 170. Further, in the present embodiment, the control unit 180 executes a startup program 200 for starting the sound recognition functions of the smart phones, using the built-in sound recognition function when a plurality of smart phones is simultaneously connected.

FIG. 5 is a diagram illustrating a functional configuration example of the startup program according to the first form. The startup program 200 includes a connection detection unit 210 that detects that the smart phone has been connected, through the communication connection unit 120, a keyword acquisition unit 220 that acquires a keyword (specific identification information) for starting the sound recognition function of the smart phone when the connection of the smart phone has been detected by the connection detection unit 210, a keyword storage unit 230 that stores the keyword, a keyword determination unit 240 that determines whether the keyword is included in the utterance sound, a selection control unit 250 that controls the selection of the output selection unit 122, based on a determination result of the keyword determination unit 240, a transmission control unit 260 that controls the transmission of the sound signal input from the microphone, and a warning unit 270 that gives warning when it has been determined that the keyword is not included by the keyword determination unit 240.

When the connection detection unit 210 has detected that the smart phone has been connected to the communication connection unit 120, the connection detection unit 210 detects device information or a model name unique to the smart phone, and provides a detection result to the keyword acquisition unit 220, the keyword storage unit 230, and the like.

When the connection of the smart phone has been detected by the connection detection unit 210, the keyword acquisition unit 220 acquires the keyword for starting the sound recognition function of the smart phone from the smart phone. The keyword may just be information that can start the sound recognition function, and its agreement is arbitrary. For example, the keyword may be a term defined in advance to start the sound recognition function mounted in the smart phone, or may be a term arbitrarily defined at the smart phone side. Further, the operation by the keyword acquisition unit 220 is not necessarily essential. If the keyword for starting the sound recognition function of the smart phone is already known by the on-vehicle device side, it is not necessary to acquire the keyword.

The keyword storage unit 230 stores the keyword acquired by the keyword acquisition unit 220, or the already known keyword set to the smart phone in advance. For example, as illustrated in FIG. 1, when a terminal name "Hoge" is provided to the smart phone 30A, and this "Hoge" is a keyword for starting the sound recognition function (or a sound recognition application) of the smart phone 30A, "Hoge" is stored in association with the device information or the model name unique to the smart phone 30A. Further, when a terminal name "Dore" is provided to the smart phone 30B, and this "Dore" is the keyword for starting the sound recognition function (or a sound recognition application) of the smart phone 30B, "Dore" is stored in association with the device information or the model number unique to the smart phone 30B.

The keyword determination unit 240 determines whether the keyword is included in a sound recognition signal S2 from the sound recognition module 110 when the utterance sound has been input from the user. The position where the keyword is included is not especially limited. However, for example, the keyword determination unit 240 determines whether the keyword is included in a head of the utterance sound. In the example of FIG. 1, the keyword determination unit 240 determines whether "Hoge" or "Dore" is included in the utterance sound. A determination result is provided to the selection control unit 250.

When it has been determined that the keyword is included by the keyword determination unit 240, the selection control unit 250 provides a selection signal SEL for selecting the smart phone identified with the keyword to the communication connection unit 120. For example, when the keyword "Hoge" is included in the sound utterance, the selection control unit 250 outputs the selection signal SEL that causes the output selection unit 122 to select the communication channel 124A.

When appropriate determination by the keyword determination unit 240 has been performed, the transmission control unit 260 controls the transmission such that the sound signal S1 is transmitted through the transmission unit 126A or 126B of the communication channel 124A or 124B selected by the selection control unit 250.

When it has been determined that the keyword is not included in the utterance sound by the keyword determination unit 240, the warning unit 270 gives warning that the keyword is not included in the utterance sound. Accordingly, the user knows that the sound utterance has been inappropriate, and the user performs a sound input again. Further, when the keyword stored in the keyword storage unit 230 overlaps, the warning unit 270 gives warning thereof. This is because if the keyword overlaps, the smart phone cannot be selected. In this case, the keyword for starting the sound recognition function of the smart phone is changed to another keyword, and this keyword is stored in the keyword storage unit 230. The method of storing the keyword may be a method using a user operation, or may be a method of causing the keyword acquisition unit 220 to acquire the keyword again by connecting the smart phone again. Further, when the keyword cannot be stored in the keyword storage unit 230, the warning unit 270 gives warning thereof. This is because if the keyword is unknown, the smart phone cannot be selected. In this case, the keyword may be stored in the keyword storage unit 230 with a user input.

Figure 6:
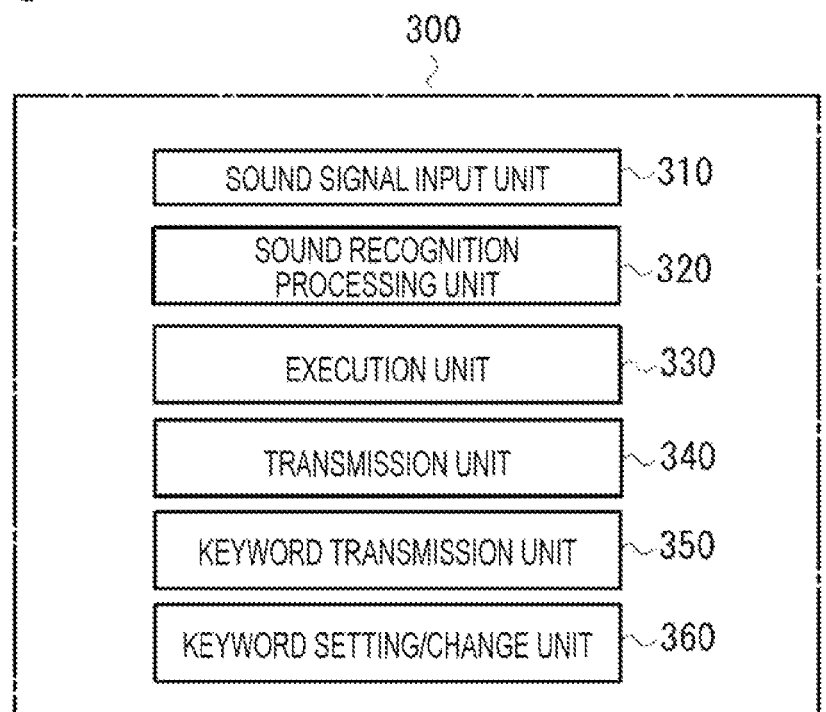
FIG. 6 is a diagram illustrating a functional configuration example of a smart phone according to the first form of the present invention.

FIG. 6 is a diagram illustrating a configuration example of a processing program included in the smart phone. A processing program 300 includes a sound signal input unit 310 that inputs the sound signal S1 from the on-vehicle device 20, a sound recognition processing unit 320 that is started by the input sound signal S1 and recognizes the sound signal S1, an execution unit 330 that executes an operation, based on a recognition result of the sound recognition processing unit 320, a transmission unit 340 that transmits a result of the operation executed by the execution unit 330 to the on-vehicle device 20, and a keyword transmission unit 350 that transmits the keyword in response to a request from the on-vehicle device 20, a keyword setting/change unit 360 that can set and change the keyword with the user input or the like.

When the utterance sound has been input to the on-vehicle device 20, the sound signal input unit 310 receives the sound signal S1 corresponding to the utterance sound transmitted by the transmission control unit 260. The sound recognition processing unit 320 is started by the keyword included in the input sound signal S1, and then performs recognition processing of the sound signal S1. The execution unit 330 executes a function corresponding to a recognition result, and the transmission unit 340 transmits an executed result to the on-vehicle device 20. For example, when utterance content of the sound signal S1 is "Hoge, reproduce music A", the sound recognition processing unit 320 is started by "Hoge", and transmits the recognition result of "Hoge, reproduce music A" to the execution unit 330. Accordingly, the execution unit 330 executes the audio reproduction function of the smart phone 30B, and reproduces the music A. The transmission unit 340 transmits the audio data of the music A executed by the execution unit 330 to the on-vehicle device 20. The on-vehicle device 20 outputs the received audio data from the sound output unit 140.

When the request from the keyword acquisition unit 220 of the on-vehicle device 20 has been given, the keyword transmission unit 350 transmits the keyword to the on-vehicle device 20 in response to the request. The keyword setting/change unit 360 stores the keyword that can start the sound recognition function of the smart phone in a memory or the like. Further, in a certain form, the smart phone can change the keyword for starting the sound recognition function. This change can be performed with a user operation. For example, when the keyword for starting the sound recognition function of the smart phone 30A is "Hoge" and if "Hoge" is common to all of the smart phones of one model, the keyword becomes the same if the smart phones of the same model are simultaneously connected to the on-vehicle device 20. To dissolve such a situation, the keyword is changed to another name, for example, to a name of the terminal of the smart phone or another specific name. In this case, the keyword setting/change unit 360 sets the specific name associated with "Hoge" to a superficial keyword, instead of changing "Hoge". That is, even if the user performs the sound utterance that includes the superficial specific name, the sound recognition function is caused to be started.

Figure 7:
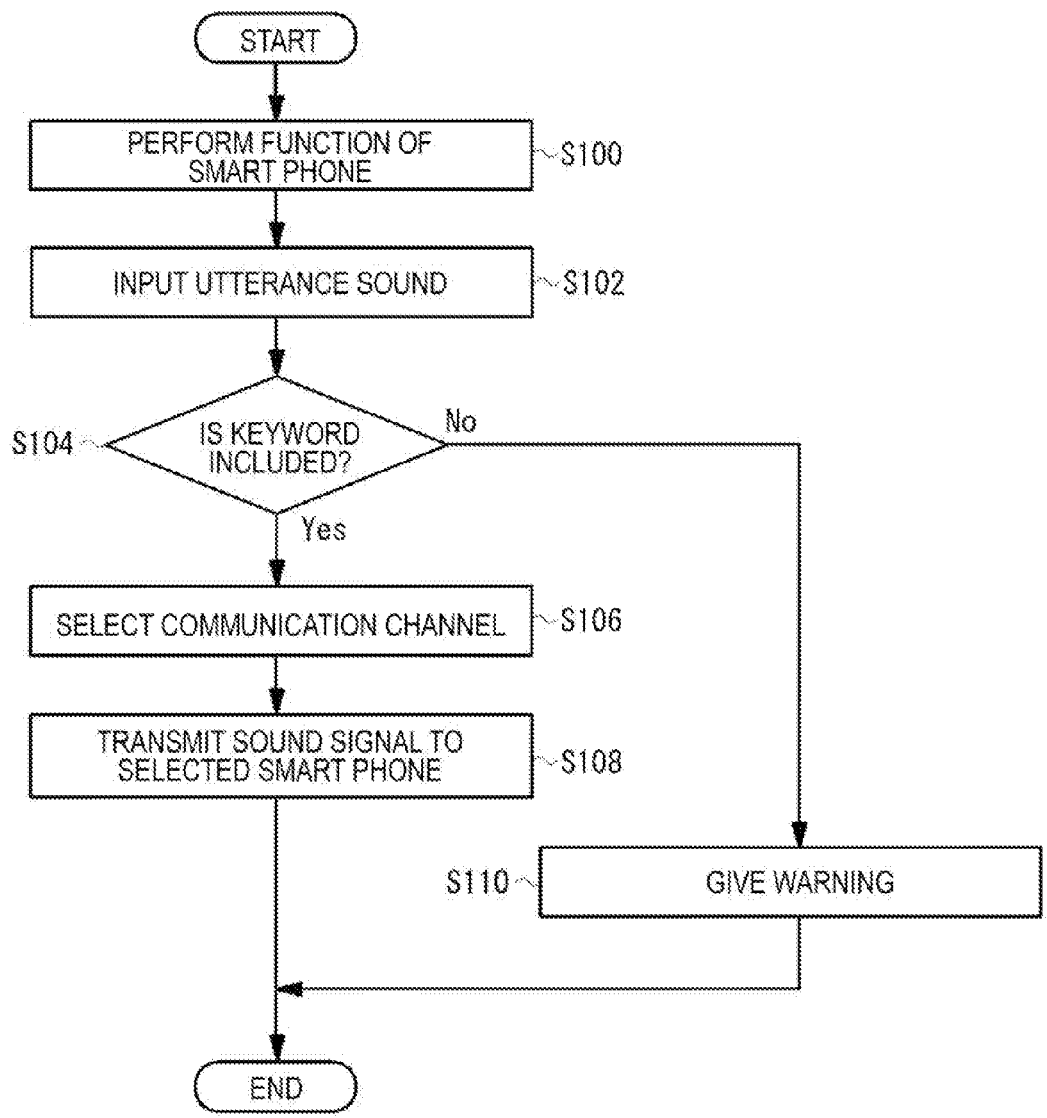
FIG. 7 is a flowchart for describing an operation of an information terminal system according to the first form of the present invention.

Next, the startup of the sound recognition function of a smart phone in the information terminal system will be described with reference to the flow of FIG. 7. First, as illustrated in FIG. 1, the audio reproduction of the smart phone 30A is performed and the audio data transmitted from the smart phone 30A is output from the sound output unit 140 of the on-vehicle device 20, and the navigation function of the smart phone 30B is performed and the load map data transmitted from the smart phone 30B is displayed on the display unit 150, in the state where the plurality of smart phones 30A and 30B is simultaneously connected (S100).

Next, the user presses the sound recognition button 24 in order to provide a desired instruction with the sound input, so that the utterance sound of the user is input to the on-vehicle device 20 (S102). When the utterance sound has been input, the startup program 200 is operated. The utterance sound is subjected to recognition processing by the sound recognition module 110, and then the keyword determination unit 240 determines whether the keyword is included in the utterance sound of the user, based on the recognized signal S2 (S104). That is, whether "Hoge" for starting the sound recognition function of the smart phone 30A or "Dore" for starting the sound recognition function of the smart phone 30B is included is determined.

When it has been determined that "Hoge" or "Dore" is included by the keyword determination unit 240, the selection control unit 250 controls the selection of the output selection unit 122 (FIG. 4), based on the keyword (S106). The selection signal SEL with which the communication channel 124A is selected when "Hoge" is included and the communication channel 124B is selected when "Dore" is included is output to the output selection unit 122. Next, the transmission control unit 260 transmits the sound signal S1 corresponding to the utterance sound to the smart phone selected through the selected communication channel (S108). Meanwhile, when it has been determined that the keyword is not included by the keyword determination unit 240, the warning is issued by the warning unit 270 (S110). As the warning, a message that notifies which smart phone has been selected cannot be identified or a message that prompts an input of the sound utterance again is issued.

Figure 8:
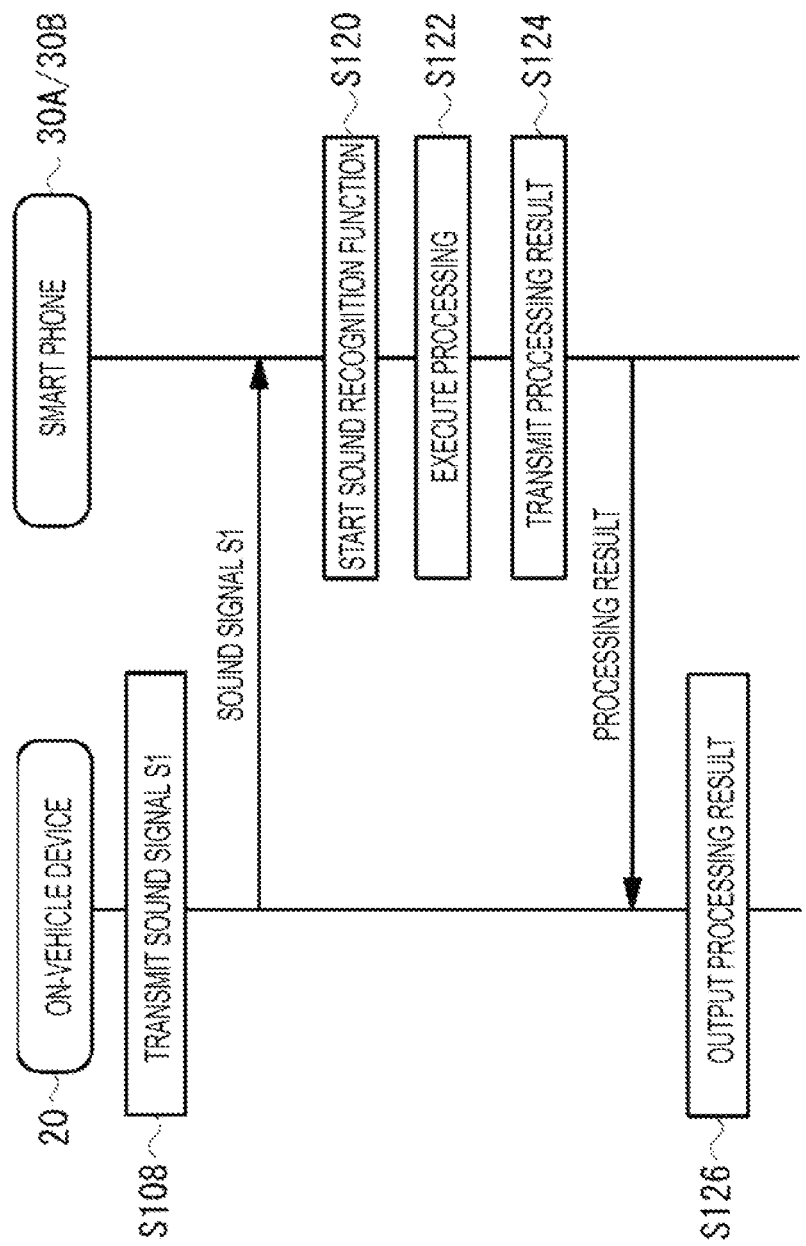
FIG. 8 is a flowchart for describing a sound recognition operation of a smart phone after a sound signal is transmitted from the on-vehicle device.

FIG. 8 is a flow for describing an operation after the sound signal S1 is transmitted from the on-vehicle device 20 to the smart phone 30A/30B. When the sound signal S1 is transmitted to the smart phone 30A/30B in step S108 of FIG. 7, the sound signal S1 is received by the sound signal input unit 310, and the sound recognition processing unit 320 is started (S120). The sound recognition processing unit 320 recognizes the sound signal S1, and the function corresponding to the recognition result is executed by the execution unit 330 (S122). The execution result by the execution unit 330 is transmitted by the transmission unit 340 to the on-vehicle device 20 (S124), and the on-vehicle device 20 receives the processing result and outputs the result (S126).

As described above, in some forms, the utterance sound input from the on-vehicle device 20 is recognized in the built-in sound recognition function (sound recognition module 110) of the on-vehicle device 20, and can be automatically selected by the startup program 200 as a transmission destination of an appropriate smart phone. For example, when the music is reproduced in the smart phone 30A and the navigation function is executed in the smart phone 30B, and the respective processing results are output from the on-vehicle device 20, if the user wishes to perform an instruction for reproduction of music, the user instructs an input of the utterance sound including the terminal name "Hoge" that is the keyword of the smart phone 30A, thereby to appropriately provide a desired instruction to the smart phone 30A, for example, an instruction of reproduction of another music. Further, when the user wishes to provide an instruction for the navigation function, the user may just instruct an input of the utterance sound including the terminal name "Dore" that is the keyword of the smart phone 30B. Accordingly, the problem that the instruction for reproduction of music is transmitted to the smart phone 30B that is executing the navigation function can be prevented.

Next, another form of the present invention will be described. The second form relates to a response of when a smart phone cannot be uniquely selected from a plurality of smart phones. Note that an on-vehicle device 20 and smart phones 30A and 30B in the second embodiment have similar configurations to the first embodiment unless otherwise especially described.

Figure 9:
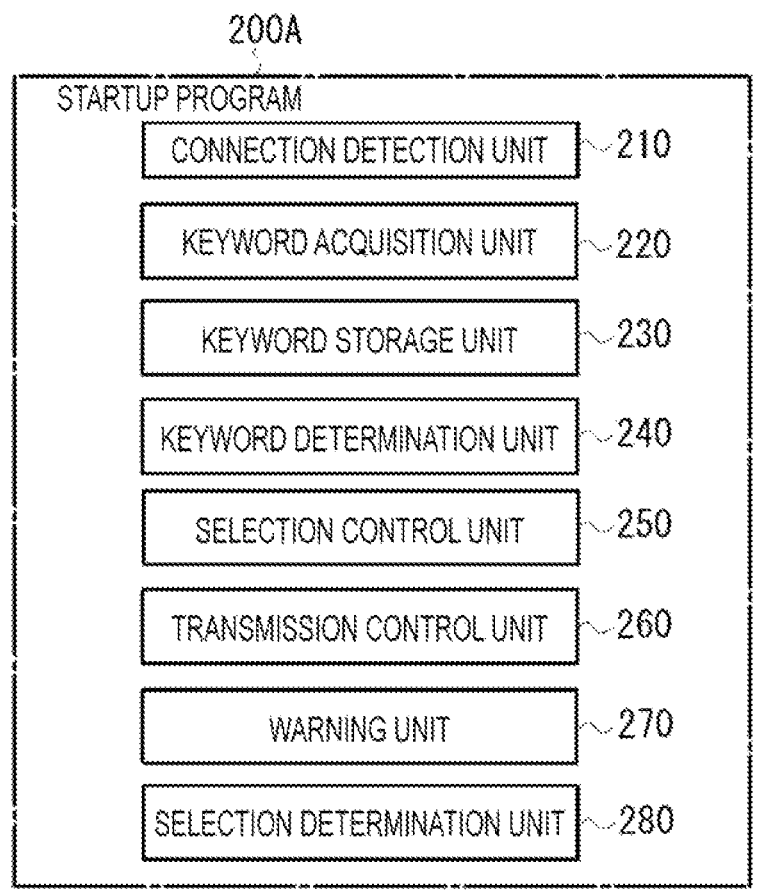
FIG. 9 is a diagram illustrating a functional configuration example of a startup program according to a second form of the present invention.

In the second form, a startup program 200A includes a selection determination unit 280 that determines whether the smart phone can be uniquely selected, as illustrated in FIG. 9. The selection determination unit 280 determines that the smart phone cannot be uniquely selected when the same keyword is set to a plurality of smart phones, or when a keyword is not set to the connected smart phone, by reference to a detection result of a connection detection unit 210 and a storage result of a keyword storage unit 230, and provides a determination result to a warning unit 270. When it has been determined that the selection is not possible by the selection determination unit 280, the warning unit 270 notifies the user of the fact that the smart phone cannot be appropriately selected. For example, the warning unit 270 outputs warning to prompt change of the keyword when the same keyword is provided to the plurality of smart phones, and outputs warning to prompt setting of a keyword when no keyword is set to the smart phone. The warning method is, for example, outputting a sound message from a sound output unit 140 or outputting a display message from a display unit 150.

Figure 10:
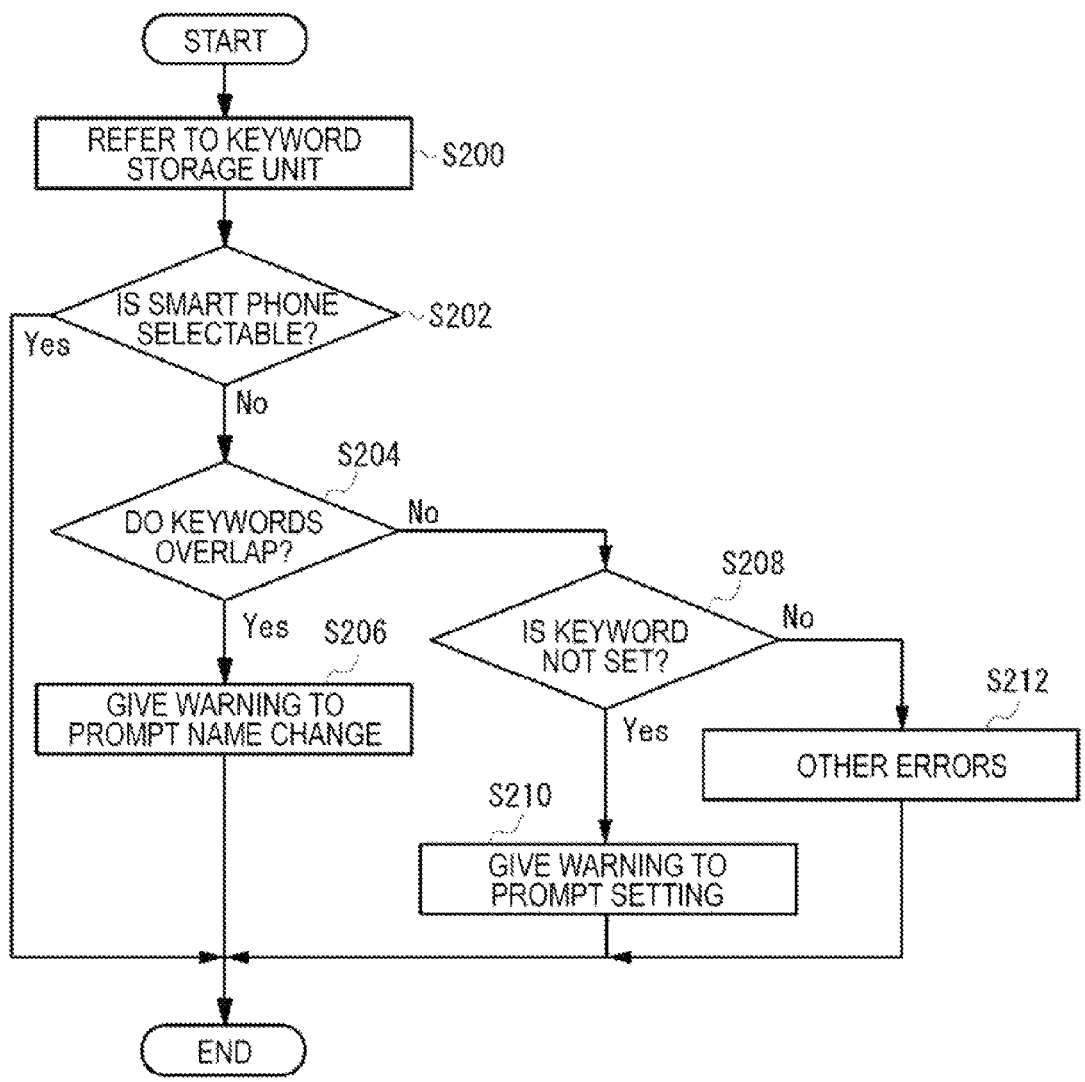
FIG. 10 is a flowchart for describing an operation with the startup program according to the second form of the present invention.
Figure 11:
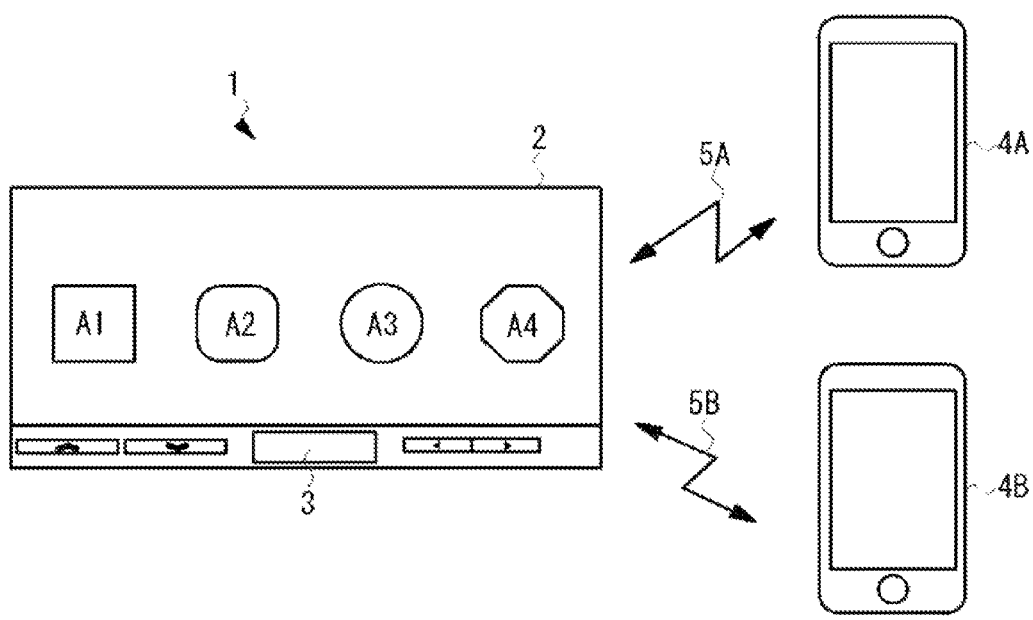
FIG. 11 is a diagram for describing problems of a conventional information terminal connection system.

FIG. 10 is a flow for describing an operation of the second form. Timing of the determination operation by the selection determination unit 280 is not especially limited. However, for example, the determination operation is performed when the smart phone is connected. First, the selection determination unit 280 refers to the detection result of the connection detection unit 210 and storage content of the keyword storage unit 230 (S200), and determines whether selection of the smart phone can be performed (S202). When it has been determined that the selection is possible, the flow is terminated. When it has been determined that the selection is not possible, the warning unit 270 outputs warning to change the keyword (S206) when the keyword overlaps (S204). The warning unit 270 outputs warning to prompt acquisition or setting of the keyword (S210) when no keyword is set (S208). When neither overlapping of the keyword nor non-setting of the keyword (S204, S208), processing is performed as other errors (S212).

When the warning of the overlapping of the keyword or non-setting of the keyword has been issued, the user can set or change the keyword with a keyword setting/change unit 360 of the smart phone side. In this case, the user changes the keyword in a state where the connection between the smart phone and the on-vehicle device 20 is cut. Then, when the smart phone is connected to the on-vehicle device 20 again, a keyword acquisition unit 220 acquires the changed keyword, and stores the keyword in a keyword storage unit 230.

As described above, according to the second form, the warning is issued when the smart phone cannot be uniquely selected, so that the user can address the problem, and appropriate selection of the smart phone becomes possible.

Note that, in the above-described forms, determination of the terminal name of the smart phone or the keyword of the name for starting the sound recognition function of the smart phone has been performed. However, this is a mere example, and another unique name may be set to the keyword. Further, in the above-described forms, an example in which the smart phones are connected to the on-vehicle device has been described. However, information terminals other than the smart phones such as tablet terminals or mobile phones may be used.

As described above, favorable forms of the present invention have been described in detail. However, the present invention is not limited to the specific forms, and various modifications and changes can be made within the scope of the gist of the invention described in the scope of claims.

It is therefore intended that the foregoing detailed description be regarded as illustrative rather than limiting, and that it be understood that it is the following claims, including all equivalents, that are intended to define the spirit and scope of this invention.

What is claimed is:

1. An electronic device comprising:
   a connection unit configured to be able to simultaneously connect a plurality of information terminals that are each provided with a sound recognition function;
   a sound input unit configured to receive an utterance sound and to output a sound signal corresponding to the utterance sound;
   a sound recognition unit configured to perform sound recognition of the sound signal output from the sound input unit;
   a determination unit configured to determine whether specific identification information is included in the sound signal, based on a sound recognition result of the sound recognition unit;
   a selection unit configured to select an information terminal to which the sound signal is to be transmitted, based on the specific identification information, when it has been determined that the specific identification information is included, by the determination unit; and
   a transmission control unit configured to transmit the sound signal through the connection unit, based on a selection result of the selection unit;
   wherein the specific identification information is information that starts the sound recognition function of the information terminal to which the sound signal is to be transmitted.

2. The electronic device according to claim 1, wherein the specific identification information is a name for identifying the information terminal to which the sound signal is to be transmitted.

3. The electronic device according to claim 1, further comprising:
   a storage unit configured to store the specific identification information in association with each information terminal connected to the connection unit,
   wherein the determination unit determines existence/non-existence of the specific identification information by reference to the storage unit.

4. The electronic device according to claim 3, wherein the specific identification information is information that starts the sound recognition function of the information terminal to which the sound signal is to be transmitted.

5. The electronic device according to claim 4, wherein the specific identification information is a name for identifying the information terminal to which the sound signal is to be transmitted.

6. The electronic device according to claim 1, further comprising:
a warning unit configured to give warning that the specific identification information is not included when it has been determined that the specific identification information is not included, by the determination unit.

7. The electronic device according to claim 6, further comprising:
an acquisition unit configured to acquire the specific identification information from an information terminal connected to the connection unit.

8. The electronic device according to claim 6,
wherein the warning unit gives warning that the specific identification information is the same when specific identification information of each information terminal connected by connection unit is the same.

9. The electronic device according to claim 6, wherein the warning unit gives warning that the specific identification information is not able to be obtained when the specific identification information of each information terminal connected by the connection unit is not able to be acquired.

10. An information terminal system comprising:
an electronic device including:
  a connection unit configured to be able to simultaneously connect a plurality of information terminals that are each provided with a sound recognition function,
  a sound input unit configured to receive an utterance sound and to output a sound signal corresponding to the utterance sound,
  a sound recognition unit configured to perform sound recognition of the sound signal output from the sound input unit,
  a determination unit configured to determine whether specific identification information is included in the sound signal, based on a sound recognition result of the sound recognition unit,
  a selection unit configured to select an information terminal to which the sound signal is to be transmitted, based on the specific identification information, when it has been determined that the specific identification information is included, by the determination unit, and
  a transmission control unit configured to transmit the sound signal through the connection unit, based on a selection result of the selection unit; and
at least first and second information terminals,
  wherein the first information terminal includes:
    a first sound recognition function configured to be started in response to first specific identification information,
    a first execution unit configured to execute a function corresponding to a recognition result of the first sound recognition function, and
    a first transmission unit configured to transmit an execution result of the first execution unit to the electronic device, and
  wherein the second information terminal includes:
    a second sound recognition function configured to be started in response to second specific identification information,
    a second execution unit configured to execute a function corresponding to a recognition result of the second sound recognition function, and
    a second transmission unit configured to transmit an execution result of the second execution unit to the electronic device, and
  wherein the electronic device includes an output unit configured to output the execution result transmitted from the first transmission unit or the second transmission unit.

11. The information terminal system according to claim 10,
wherein the first information terminal includes the first transmission unit configured to transmit the first specific identification information when the first information terminal is connected to the electronic device through the connection unit, and the second information terminal includes the second transmission unit configured to transmit the second specific identification information when the second transmission unit is connected to the electronic device through the connection unit.

12. The information terminal system according to claim 11,
wherein the first information terminal includes a first setting unit configured to set the first specific identification information, and the second information terminal includes a second setting unit configured to set the second specific identification information.

13. A method of starting a sound recognition function in an electronic device including a connection unit configured to be able to simultaneously connect a plurality of information terminals that are each provided with the sound recognition function, and a sound input unit configured to receive an utterance sound, and provide a sound signal corresponding to the utterance sound, the method comprising the steps of:
recognizing a sound signal provided from the sound input unit;
determining whether specific identification information is included in the sound signal recognized in the sound recognition step;
selecting an information terminal to which the sound signal is to be transmitted, based on the specific identification information when it has been determined that the specific identification information is included; and
transmitting the sound signal to the selected information terminal,
wherein the specific identification information is information that starts the sound recognition function of the information terminal to which the sound signal is to be transmitted.

14. The method of starting a sound recognition function according to claim 13, the method further comprising the step of:
storing the specific identification information in association with each information terminal connected to the connection unit,
wherein the determining step determines existence/non-existence of the specific identification information by reference to the specific identification information stored in the storing step.

15. The method of starting a sound recognition function according to claim 14, the method further comprising the step of:
  acquiring the specific identification information from an information terminal connected to the connection unit.

* * * * *